États-Unis Patent Office 2,919,059
Patented Dec. 29, 1959

2,919,059

PRODUCTION OF PACKAGES

Arthur F. Sporka, Lombard, Ill., assignor to Tee-Pak, Inc., a corporation of Illinois No Drawing. Application October 26, 1954
Serial No. 464,894

7 Claims. (Cl. 229—3.5)

This invention relates to the production of packaging materials, packages and methods of manufacturing the same.

The use of plastic film materials as package-forming media for the packaging of food products such as cheese, ground meats and the like, as well as for a host of other items, has increased rapidly in recent years.

The use of plastic film materials in the form of multiply laminates further extended the utility of packaging films because laminates composed of the same or different film can be produced, by proper selection of individual films comprising the laminate, so as to meet the diverse requirements of moisture-proofness, resistance to failure induced by temperature variations to which packages are exposed, clarity, strength, printability, and the like, called for by the packaging trade.

A major stimulus in this direction has been the development of packages composed of multi-ply laminates wherein the films used have sufficient cohesive affinity for each other so that their inherent or natural cling is adequate to effect adhesion of one film to another, without the necessity for using glues, adhesives and the like to keep the plies together. The production of such unique products is disclosed in U.S. Patent No. 2,679,968 and 2,679,969 which describe the preparation of packages from plastic film in the form of composites formed of two or more plies of the same or different films, the plies being laminated without the necessity of using any adhesives. Packages such as tubes, bags and the like formed from laminates composed of such film combinations may be printed or unprinted, may have printing positioned between plies, and may be either in clear transparent form or contain filters, dyes and similar additives.

In order to be most successfully and economically used in the production of multi-ply laminate packages, it is necessary to use plastic films which have such a degree of cohesive affinity for one another that they cohere as when wound together onto a reel under ordinary tension, to such a degree that the resulting multi-ply laminate acquires the integral and unitary character and general appearance of a single layer of film. In commercial practice, only such pressure as is applied by winding the component films on a reel under ordinary tension such as is employed in winding plastic film onto rolls, is generally enough to cause these film combinations to adhere satisfactorily.

While, as pointed out in the aforesaid patents, there are a great many films which have sufficient self-cohesive character to be used in the preparation of packages such as tubes, bags and the like, it is nevertheless true that one of the most abundant packaging films, namely polyethylene, has not been used in the preparation of multi-ply laminates of the character described in the aforesaid patents. The reason for this is that polyethylene film, as ordinarily produced has a complete lack of the essential cohesive quality which a film must have if it is to be used in the production of that type of multi-ply laminate package.

This has been an unfortunate circumstance for polyethylene film producers, converters, packagers, and the public as well since polyethylene, except for its lack of cling or self-cohesiveness, is otherwise eminently suitable for the production of packages in the form of laminates because of its cheapness, strength, clarity and sealability.

I have now found that by using polyethylene film which has been subjected during its production, or thereafter, to certain treatments which are hereinafter described, I can produce multi-ply laminates with polyethylene film alone or with a number of other plastic films, without requiring the use of adhesives to keep the plies together, so that laminates can be used in the production of novel packages having unique and highly desirable properties. These laminates may be used in the production of packages, including bags, tubes and tubed reel stock, and roll stock (untubed film stock) and sheets intended for use in the production of such packages. The plies of the laminates will be in intimate contact, but may of course, have printing therebetween.

The modified polyethylene film used in the production of the novel packages of this invention has, and must have a minimum cling shear strength of at least approximately 150 grams per square inch as determined by measuring the force necessary to break one square inch of surface contact between two portions of the film. In the determination of cling shear strength a model IR4 Scott Tensile Tester is used to apply a constantly increasing force to samples of film in contact with one another. The total force at the break point is automatically recorded on the instrument and this force per unit area of contact is taken as the measure of cling.

Samples for the "cling shear strength" test are prepared by cutting 1" wide strips of one film and overlapping a known length of this film on the companion test film. The area of contact is smoothed out by hand to insure complete and intimate contact and the "single" strip which is obtained may be considered as being composed of one film at one end and the second film at the other end with a known area of contact between the two films. No heat, chemical, or other method of sealing is used. One end of the combined strip is placed in the stationary clamp of the tensile tester and the other end fastened in the movable clamp through which the load is applied at constant rate of increase.

Examples of data obtained for several samples of film combinations are illustrated in Table 1 below.

TABLE 1

| | Cling shear strength gm./sq. inch |
|---|---|
| Polyethylene A-polyethylene A [1] | 0 |
| Polyethylene A-saran (Dow A517) | 0 |
| Special polyethylene-special polyethylene [2] | 540 |
| Special polyethylene-saran (Dow A517) | 432 |

[1] Polyethylene A is the commercially available polyethylene film as Durethene, Visqueen, etc.
[2] Special polyethylene is polyethylene film made by shock chilling film before it has set; film of similar cling properties can also be prepared by oxidation or halogenation of film surfaces and by application of electrostatic charges thereto.

It is seen from the above that ordinary commercial polyethylene film, exemplified by such products as Durethene has an unmeasurable amount of cling shear strength when in contact either with itself or even with such inherently cohesive films as saran, this despite the fact that saran will cling to itself with an outstandingly high degree of cohesive force. Special polyethylene on the other hand has a substantial amount of such cohesive force, which is more than enough to make the film completely satisfactory as a component of multi-ply laminates of the type whose plies adhere to each other without requiring use of adhesives for this purpose.

There are a number of ways in which polyethylene having the requisite cling shear strength can be produced. Thus ordinary commercial polyethylene film may be treated as by oxidation with various oxidizing agents, by halogenation, giving an electrostatic charge, or by giving the film, preferably while it is still in a plastic unset state, a tempering treatment involving a rapid and substantial change in temperature ("shock chilling") of the film which may be accompanied by concurrent or subsequent stretching. Polyethylene film which already has some cling shear strength can be treated as by passing the film over stationary bars to induce additional cling shear strength. The latter method which is one of the presently preferred procedures for producing such modified polyethylene film involves generally contacting polyethylene film after it has been extruded from a die and while it is still at an elevated temperature with a cold medium to instantaneously chill the film. This appears to result in some sort of molecular arrangement or rearrangement, or orientation not yet fully understood but the net result of which is a desired modification of the surfaces of the polyethylene film and an impartation to those surfaces of the self-cohesive properties hereinbefore described.

By way of illustration, such film may be produced by a modification of the procedures described in, for example, U.S. Patent No. 2,461,975 and U.S. Patent No. 2,632,206 wherein a hot melt of polyethylene resin is forced through an orifice in a form of a tube, and the resulting tube is contacted with a stream of air to set the plastic tube. The tube is then passed through a pair of rotating squeeze rolls which collapse the tubing into a flattened ribbon which is then wound upon a reel. In accordance with a commercial practice, the conditions of setting the thermo plastic polyethylene tube are such that the resulting film is not cohesive, and in fact has a cling shear strength which is barely, if at all measurable.

However, and herein is the aforesaid modification, if instead of setting the plastic tube as it leaves the annular orifice by the use of room temperature air, the tubing is rapidly and drastically chilled, ("shock chilled") so that the film's temperature is rapidly brought down to about 40° F. or lower, the resulting film will have a cling shear strength of at least 150 grams per square inch which will permit the thus modified polyethylene film to be used in the formation of laminates with itself, or with other films without requiring the use of adhesives to keep the plies together.

Polyethylene film suitable for the production of the unique packages of my invention may also be prepared by extruding a hot melt of polyethylene resin through a die in the form of a sheet and then shock chilling the extruded sheet material by passing it over a chill roll which is preferably chilled to about 40° F. or lower.

In brief, if the polyethylene film while still in a plastic state, as just after it has left a die through which a hot melt of polyethylene resin has been forced, is shock chilled to a temperature of about 40° F. or lower, the resulting film will be found to have the cling shear strength needed for the production of laminates and packaging materials in accordance with the present invention. Less preferably, the already formed tubing after it has been produced by conventional procedures such as described in the aforesaid patents may be heated to a temperature below that at which the film becomes plastic and then quickly shock chilled by contacting it with a chill roll or a fluid at a temperature of approximately 40° F. or lower.

Some polyethylene films, generally those that have been given an insufficient treatment of the types described above, exhibit a transitory cling shear strength that is obtained when two surfaces thereof are paired during the manufacturing process. This cling shear strength is lost when the surfaces are parted. The cling shear strength herein referred to is that which is exhibited after the originally paired surfaces have been parted and one such surface is then intimately contacted with the surface of another film. It also should be noted that some polyethylene films that exhibit the requisite cling shear strength on one surface, do not possess the same cling shear strength on the other surface. This, of course, can be determined in the manner outlined above.

Among the film combinations which I have found are particularly suitable for use in preparing laminates with polyethylene film (having a cling shear strength of at least 150 grams per square inch) which are to be used for making packages, are the following:

Group A

Polyethylene-vinyl
Polyethylene-saran
Polyethylene-cellulose acetate
Polyethylene-polyethylene
Polyethylene-cellophane

Group B

Polyethylene-Mylar
Polyethylene-Pliofilm

The group A film combinations have an outstandingly high degree of cohesive affinity for each other; the group B combinations have somewhat less of such affinity but are adequate for certain purposes where such lesser affinity is not of critical consideration.

Other examples of useful combination of film wherein one of the films is polyethylene having a cling shear strength of at least 150 grams per square inch are as follows:

Cellophane-saran-polyethylene
Saran-cellophane-polyethylene
Saran-vinyl-polyethylene
Polyethylene-cellulose acetate-polyethylene
Polyethylene-saran-polyethylene
Polyethylene-cellophane-polyethylene
Polyethylene-vinyl-polyethylene
Polyethylene-Pliofilm-polyethylene The commercial identification of some of the films listed above is as follows:

| Trade Name and Supplier | Material | Type | Thickness (Mils) |
|---|---|---|---|
| Polyethylene (Dow) | Polyethylene | Q-641 | 1.0 |
| Mylar (Du Pont) | Polyethylene Terephthalate. | A | 1.0 |
| Pliofilm (Goodyear) | Rubber Hydrochloride. | HM | 1.2 |
| Cellulose Acetate | | | 1.0 |
| Cellophane (Du Pont) | Regenerated Cellulose Coated. | MST-54 | 1.5 |
| Vinyl (General Tire & Rubber Co.) | Vinyl Chloride Acetate Copolymer. | XV-174 | 2.0 |
| Saran (Dow) | Polyvinylidene Chloride. | B-517 | 1.0 |

Packaging materials in the form of multi-ply laminates, wherein one of the films is polyethylene having a cling shear strength of at least 150 grams per square inch, may be formed by winding the component films together on a reel. If desired, the films making up the composite or laminate may be printed and the laminate made up so that the printed images are on the inside or on the outside. Generally, it is preferable to have the printing between the layers for the protection against rubbing, scuffing and the like afforded thereby. Inks used in such procedure need not be rapid drying, nor need they be hard enough to prevent offset or blocking; actually soft inks that cause clocking of the rolls are generally preferable when the printing is to be between the layers of film.

When the printing is between the plies, the outer ply or plies should of course, generally be transparent so that the design may be visible to the viewer.

A particular advantage of the packages of the present invention wherein a multi-ply laminate is composed of at least one layer of polyethylene film having a cling shear strength of at least about 150 grams per square inch, lies in the relatively low temperature flexibility of such laminates. For example, a saran-polyethylene laminate in the form of a bag can now be used the year around to package such materials as candies and the like. This is because the modified polyethylene imparts to the laminated bag resistance to breakage caused by cold weather—one of the undesirable characteristics of bags made of only saran. This problem has been so serious that candy manufacturers have given up using saran bags with the approach of cold weather due to the high percentage of returns caused by rupture of the saran bags, resulting from exposure of the packaged candy to low winter temperatures.

Films made of mixtures of polyethylene resin with for example, micro-crystalline waxes, butyl rubber, and the like, wherein such additives are present in the amount of up to about 10% and even more can be used in producing the laminated film packages of the present invention, provided the film has been treated so as to have the requisite cling shear strength, namely at least 150 grams per square inch.

Having described my invention, I claim:

1. A package formed of a laminate comprising a plurality of plies of thin flexible film, each of said plies adhering to an adjoining ply as a result of the inherent attractive forces in the face-to-face surfaces of said adjoining plies, at least one of said plies being composed of polyethylene film which has been subjected to surface-modifying conditions effective to impart to said polyethylene film a cling shear strength of at least about 150 grams per square inch.

2. A package formed of two plies of thin flexible polyethylene film, each of said plies adhering to an adjoining ply as a result of the inherent attractive forces in the face-to-face surfaces of said adjoining plies, said plies being composed of polyethylene film which has been subjected to a surface-modifying treatment effective to impart to said film a cling shear strength of at least about 150 grams per square inch.

3. The package of claim 2 in which at least the outer ply is transparent, and in which one of said plies has printing on that surface which is in intimate contact with a surface of the other ply.

4. The article of claim 3 wherein the package is in the form of a bag.

5. A package formed of two plies of thin flexible cohering film, said two-ply film being selected from the group of pairs consisting of polyethylene film which has been subjected to a surface-modifying treatment effective to impart to said polyethylene film a cling shear strength of at least about 150 grams per square inch, and a film selected from the group consisting of polyvinylidene chloride, vinyl chloride-acetate copolymer, cellulose acetate and cellophane, the face-to-face surfaces of said plies being in intimate contact with each other, and one of said plies having printing on that surface which is in intimate contact with a surface of the other ply.

6. The package of claim 5 in which at least the outer ply is transparent and in which one of said plies has printing on that surface which is in intimate contact with a surface of the other ply.

7. The article of claim 6 wherein the package is in the form of a bag.

References Cited in the file of this patent

UNITED STATES PATENTS

| | | |
|---|---|---|
| 2,679,968 | Richter | June 1, 1954 |
| 2,679,969 | Richter | June 1, 1954 |
| 2,704,382 | Kreidl | Mar. 22, 1955 |